United States Patent
Bishop et al.

(10) Patent No.: US 11,733,125 B2
(45) Date of Patent: Aug. 22, 2023

(54) AUTO-ADJUSTING ANALOG ULTRASONIC SENSOR

(71) Applicant: U.E. Systems, Inc., Elmsford, NY (US)

(72) Inventors: William Bishop, Pleasantville, NY (US); Gary Mohr, Cortlandt Manor, NY (US)

(73) Assignee: U.E. SYSTEMS, INC., Elmsford, NY (US)

( * ) Notice: Subject to any disclaimer, the term of this patent is extended or adjusted under 35 U.S.C. 154(b) by 0 days.

(21) Appl. No.: 17/530,249

(22) Filed: Nov. 18, 2021

(65) Prior Publication Data

US 2022/0196518 A1    Jun. 23, 2022

Related U.S. Application Data

(63) Continuation-in-part of application No. 17/131,523, filed on Dec. 22, 2020.

(51) Int. Cl.
    *G01M 13/045* (2019.01)
    *G01M 3/24* (2006.01)
    *H04B 11/00* (2006.01)

(52) U.S. Cl.
    CPC ........... *G01M 13/045* (2013.01); *G01M 3/24* (2013.01); *H04B 11/00* (2013.01)

(58) Field of Classification Search
    None
    See application file for complete search history.

(56) References Cited

U.S. PATENT DOCUMENTS

| 745,768 A | 12/1903 | Goodman et al. |
| 4,785,659 A | 11/1988 | Rose et al. |

(Continued)

FOREIGN PATENT DOCUMENTS

| EP | 2558767 B1 | 11/2020 |
| GB | 2358470 A | 7/2001 |
| JP | H02218363 A | 8/1990 |

OTHER PUBLICATIONS

International Search Report and Written Opinion in corresponding International Application No. PCT/US2021/064781, dated Mar. 29, 2022.

(Continued)

*Primary Examiner* — Raul J Rios Russo
*Assistant Examiner* — Carl F. R. Tchatchouang
(74) *Attorney, Agent, or Firm* — Leason Ellis LLP

(57) ABSTRACT

An automatic sensitivity adjusting analog ultrasonic sensor includes an ultrasonic transducer, and a front end adjustable gain amplifier that amplifies the received ultrasonic signal from the transducer. A processor generates a carrier signal and a heterodyning circuit combines the carrier signal and the amplified ultrasonic signal to form a modulated signal spectrum from which an audio spectrum signal is generated. The processor further monitors the amplitude level of the audio spectrum signal and executes an auto sensitivity adjustment algorithm that automatically adjusts the sensitivity (the gain) of the analog front end amplifier down if the amplitude is above a preset upper threshold or up if the amplitude is below a present lower threshold. The processor may also further monitors the amplitude level of the ultrasonic signal level directly from the front end adjustable gain amplifier and execute the auto sensitivity adjustment algorithm as required.

19 Claims, 3 Drawing Sheets

(56) References Cited

U.S. PATENT DOCUMENTS

| | | | |
|---|---|---|---|
| RE33,977 E | 6/1992 | Goodman et al. | |
| 6,101,427 A | 8/2000 | Yang | |
| 6,122,966 A | 9/2000 | Goodman et al. | |
| 6,339,961 B1 | 1/2002 | Goodman et al. | |
| 6,996,030 B2 * | 2/2006 | Goodman | G01N 29/0609 367/176 |
| 8,707,785 B2 | 4/2014 | Goodman et al. | |
| 8,746,068 B2 | 6/2014 | Goodman et al. | |
| 9,200,979 B2 | 12/2015 | Goodman et al. | |
| 2003/0062380 A1 | 4/2003 | Boyle et al. | |
| 2012/0132304 A1 | 5/2012 | Conley et al. | |
| 2017/0215841 A1 | 8/2017 | Pandey | |
| 2020/0296513 A1 | 9/2020 | Littrell | |

OTHER PUBLICATIONS

Extended European Search Report in corresponding European Application No. EP 22207429.6, dated Apr. 18, 2023.
Bhattaru Purnendu et al: "A 36dB Gain Range, 0.5dB Gain Step Variable Gain Third-Order Filter for Portable Ultrasound Systems", 2020 33rd International Conference On VLSI Design And 2020 19th International Conference On Embedded Systems (VLSID), IEEE, Jan. 4, 2020 (Jan. 4, 2020), pp. 96-100.

\* cited by examiner

AUTO-ADJUSTING ANALOG ULTRASONIC SENSOR

CROSS REFERENCE TO RELATED PATENT APPLICATIONS

The present application is a continuation-in-part of U.S. patent application Ser. No. 17/131,523 filed Dec. 22, 2020 and entitled Globally-Based Automatic Lubrication System, the contents of which are incorporated herein by reference in its entirety.

FIELD OF THE INVENTION

The present invention relates generally to the receipt of ultrasonic signals as a means for the detecting mechanical faults and, more particularly, to a sensor for an ultrasonic detection system that automatically adjusts its dynamic range in response to the amplitude of the received ultrasonic signal.

BACKGROUND OF THE INVENTION

Ultrasonic sensors have been used to detect ultrasonic energy generated by friction within mechanical devices, such as that created by deteriorated bearings, as disclosed in U.S. Pat. No. Re. 33,977 to Goodman, et al., the contents of which are hereby incorporated herein by reference in its entirety. The greater the amount of friction, the greater is the intensity of the generated ultrasonic energy. Applying a lubricant to the device reduces friction and consequently the intensity of the generated ultrasound drops. Measuring ultrasonic energy thus provides a way to determine when lubrication has reached the friction generating surfaces. Additionally, faulty devices, such as bearings, generate a higher level of ultrasonic energy than do good bearings and thus, this condition can also be detected.

Not only can under-lubrication quickly lead to bearing damage from increased friction, over lubrication can also be a problem. Over-lubrication can increase heat, damage bearing seals, and/or contaminate motor windings.

As indicated in U.S. Pat. No. 6,996,030 of Goodman et al. (which is incorporated herein by reference in its entirety) ultrasonic transducers generally produce a low voltage output in response to received ultrasonic energy. Thus, it is necessary to amplify the detected signal using a high-gain preamplifier before it can be accurately processed. However, if low cost heterodyning and display circuitry are to be used, means must be made available to attenuate the amplified signal to prevent saturating these circuits when high input signals are present. This attenuation also adjusts the sensitivity of the device. In such devices in the prior art the degree of attenuation is manually selectable by the user. For example, U.S. Pat. No. 4,785,659 to Rose et al. discloses an ultrasonic leak detector with a variable resistor attenuator used to adjust the output level of an LED bar graph display. U.S. Pat. No. 6,996,030 of Goodman (Goodman '030) has an amplifier controlled sensitivity setting such that the overall sensitivity of the system is determined by a microcontroller, whereby an operator using a dial on a front panel of the instrument can adjust the overall sensitivity. As a result, if the sensitivity of the system is lowered by a predetermined level, a clipped (saturated) signal output from the amplifier is toggled such that gain switching occurs at the transducer pre-amp and at a variable gain amplifier.

The Goodman '030 patent discloses a sensitivity encoder 100 that is used to increase or decrease the sensitivity level of a dual heterodyne circuit. The sensitivity is adjusted by turning a rotational knob that is located at the back of the housing. In preferred embodiments, the sensitivity encoder is a rotational optical encoder, whose rotation changes the output level of the control voltage that controls the gain of the amplifier so as to produce proportional changes in the sensitivity level of the dual heterodyne circuit.

U.S. Pat. No. 8,745,768 of Goodman and U.S. Pat. No. 9,200,979 of Goodman (which are incorporated herein by reference in their entirety) disclose a front end CPU that is a sub-processor that carriers out detailed instructions from a main CPU to set the sensitivity and frequency in response to operator selection at a touch screen as interpreted by the main CPU.

As indicated in the parent application of this application, i.e., Ser. No. 17/131,523, when the ultrasonic signal from a sensor is provided to an analog front end circuit, it can be buffered and conditioned. This front end circuit can also have a dynamic range adjustment to set its gain based on the amplitude of the base ultrasonic signal, so the control unit does not have to be modified for the ultrasonic signal level of different bearings. The prior art manually adjustable sensitivity range where typically 40 dB.

An auto-adjusting analog ultrasonic sensor that accomplishes this gain adjustment function without manual intervention would be of great benefit in the art. Where the sensor is remote, manual adjustment of its sensitivity in view of changing circumstances (a sudden large ultrasonic signal) is not practical.

SUMMARY OF THE INVENTION

The present invention is an analog ultrasonic sensor with an automatic sensitivity adjustment. It can operate continuously unattended. The sensor has an enhanced dynamic range, essentially making it more sensitive and thus useable for difficult applications that could only be addressed with handheld devices where the user is available to manually adjust the sensitivity, as opposed to situations where the user is remote. Along with the extra sensitivity, this sensor of the present invention is able to control the attenuation or simply turn it down when needed.

The situation can be complicated where a lower power consumption is needed, e.g. on battery operated devices. This lower power consumption also lowers the dynamic range at any single setting. The prior art handheld devices had a couple of methods to adjust the sensitivity, but they required user intervention. The present invention is a sensor that self-adjusts its own sensitivity with no intervention from the user. This is a huge benefit when applying it to the field of remote sensing, including bearing fault detection, valve leakage and steam trap issues.

The auto-sensitivity adjustment feature enables users to automatically tune into bearing sound and clearly identify lubrication and health issues at speeds as low as 1 RPM and to trap sound so as to clearly identify leaking or blowing traps and valves. The automatic sensitivity adjustment is from 0 dB to 100 dB, and may be extendable to 120 dB.

The auto-sensitive sensor passively senses ultrasounds produced by mechanical equipment in the form of friction, impacting and turbulence, and processes the level of decibels into an analog signal that works seamlessly with existing PLC's, SCADA, DCS and other automation systems. This, in turn, supports real-time data trending and alerting, making it possible to detect and address important issues earlier and faster. The sensor also employs Edge Analytics—allowing for in-device data processing, less reliance on cloud computing, and the ability to act on information in real-time.

In an exemplary embodiment the ultrasound is detected by the ultrasonic transducer and conditioned by an analog front end variable gain amplifier. The output of the analog front end ultrasound is fed to the input of heterodyne circuitry and simultaneously into one channel of a processor's analog-to-digital converter. The processor generates a configurable carrier signal for the heterodyne circuit's mixer with a frequency range of 20 kHz to 100 kHz, which is used to perform analog amplitude modulation (heterodyning).

The processor monitors the digitized amplitude level of both the ultrasound and the audio and automatically adjusts the sensitivity (the gain) of the analog front end preamplifier if the digitized amplitude level is out of range. This is called "auto sensitivity adjustment."

An auto sensitivity adjustment algorithm determines whether the signal is saturating, or above the threshold, which can keep it from making accurate decibel calculations. The processor calculates a lower sensitivity setting to bring the ultrasonic signal to within an acceptable working range. Conversely, if the ultrasonic signal is determined to be too low to make an accurate decibel calculation, the auto sensitivity algorithm calculates a higher sensitivity setting to bring the ultrasonic signal to within an acceptable working range. When the ultrasound and/or the audio is in an acceptable working range, the processor will calculate the ultrasound amplitude dB value and the audio amplitude dB value.

In addition to calculating sensitivity, the processor may perform fast Fourier transfer (FFT) calculations and/or execute other digital signal processing algorithms. The processor provides dB and data outputs by means of digital-to-analog converters and communication ports and protocols.

The sensor techniques include generation of a configurable carrier signal, performing digital amplitude modulation with the configurable carrier frequency and the digitizing of the amplitude of the ultrasound, and extracting the digital heterodyned audio spectrum digital audio produced by the digital AM modulation. The processor also has the ability perform FFT, or use other analysis algorithms on the ultrasound and/or the heterodyned ultrasound audio signal.

The sensor provides enhanced signal processing capabilities for the detected ultrasound or heterodyned ultrasound signals, such as spurious glitch detection and/or filtering, fast or slow peak detection, and other advanced pattern recognition capabilities that allow for the detection, processing, and/or reporting of specific events. In addition, the ability of the sensor to self-adjust its range typically gives the device a 100 dB range, and may even have up to a 120 dB range. Many times the input ultrasound signal would fluctuate outside of the typical 40 dB range of the prior art. This made it difficult for the operator to try to manually set the sensor in the correct range. This difficulty is eliminated by the present invention.

The analog output signal is a continuous linear analog output, across the full range of sensitivity, proportional to the dB (decibel) value of the ultrasound and/or the heterodyned ultrasound audio signal amplitudes. The sensor can provide FFT data, and temperature measurements, heterodyned audio, and digital signal processing data outputs.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1:
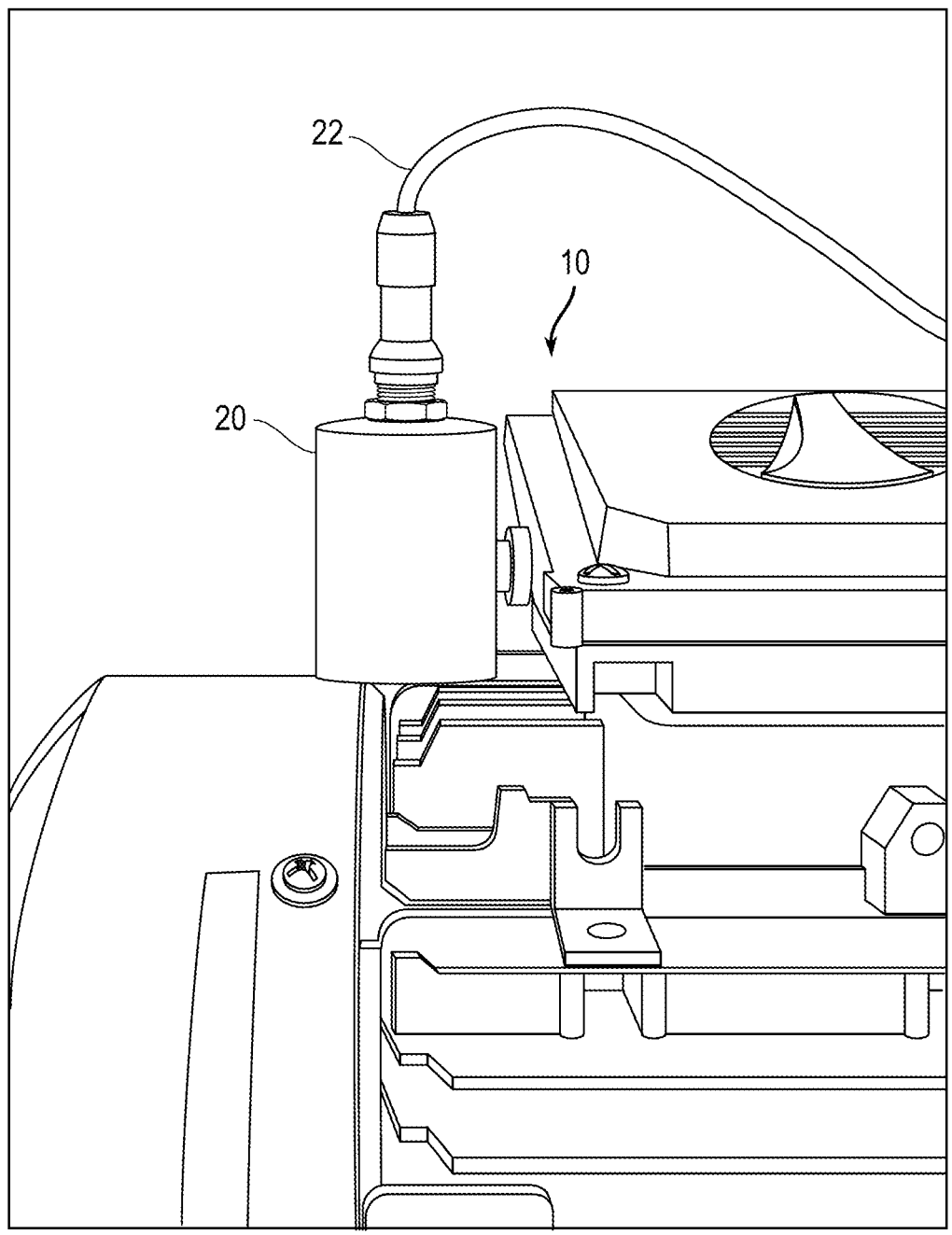
FIG. 1 is an image of the auto-adjusting analog ultrasonic sensor of the present invention mounted on a motor with bearings that are being checked.

In one embodiment of the present invention there are organizations responsible for maintenance at large factories spread out over acres of land. Such factories frequently contain numerous motors, each having at least one set of bearings. FIG. 1 shows a portion of one such motor 10.

According to the present invention, an auto-adjusting analog ultrasonic sensor or detectors 20 is located on the housing of the motor 10 in which the bearings are located by means of a solid sensor mounting stud. These detectors are contact sensors, and each provides an ultrasonic signal with information about the status of the associated bearing. A lubrication source (not shown) is mounted within a local controller (not shown) and is connected to the bearing through a lubrication tube (not shown) that passes lubrication to a grease fitting on the housing. The bearing information is passed through wires in cable 22 to the local controller. Based on the level of ultrasound detected by the sensor above normal levels, the local controller causes lubricant to be automatically injected through the lubrication tube (not shown) into the bearings grease fitting (not shown) until the ultrasound level returns to normal. A typical single point lubricator may contain, e.g., 250 cc of lubricant. A microprocessor-controlled, energy efficient motor in the local controller can be used to drive a pump or piston to deliver lubricant (e.g., grease) to the bearings with precision.

Figure 2:
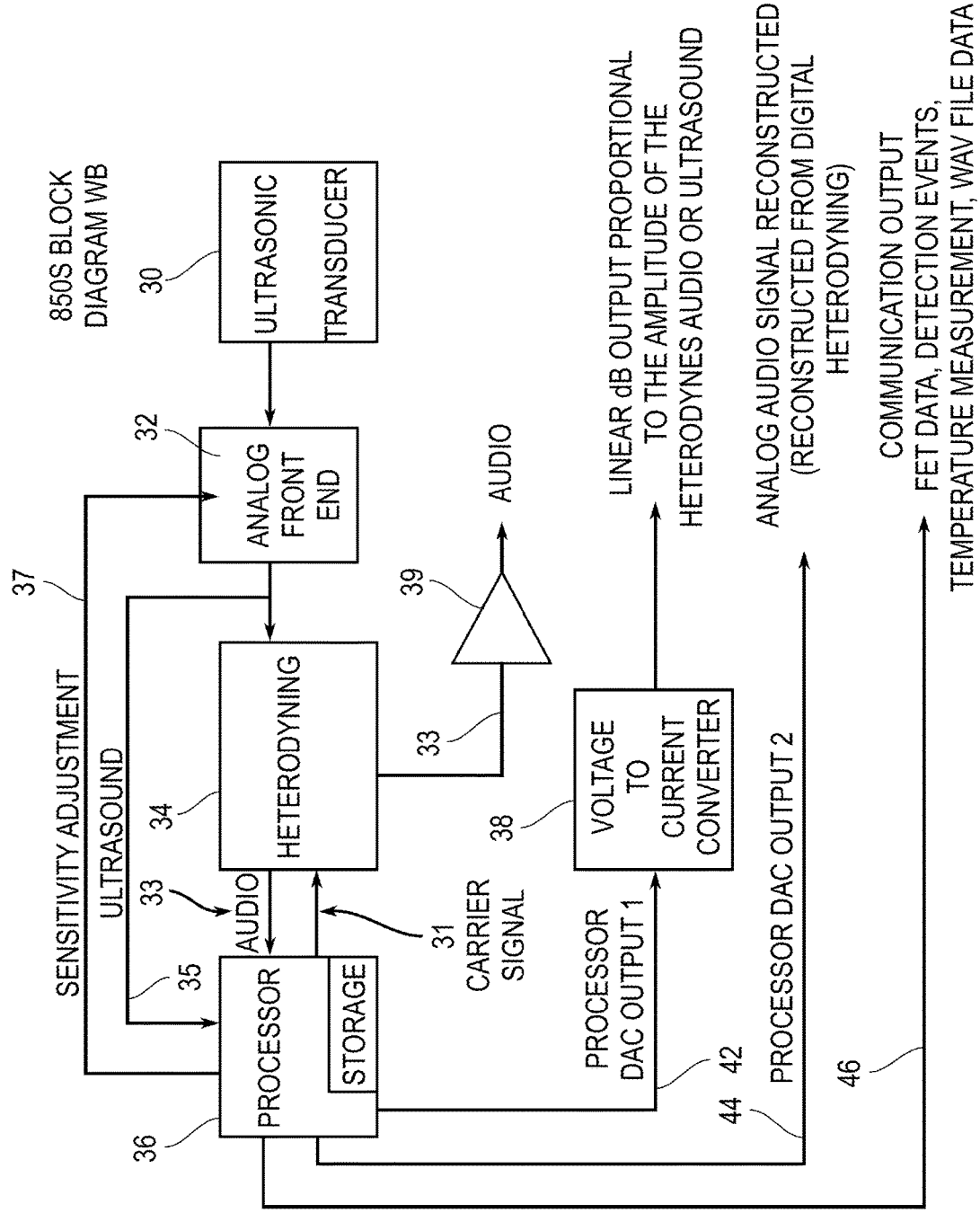
FIG. 2 is a block diagram of the auto-adjusting circuit of the present invention.

As shown in FIG. 2, the ultrasonic sensor 20 includes at least one transducer 30 that picks up an ultrasonic signal from the bearings and passes it to an analog front end variable gain amplifier 32, which converts it into an amplified ultrasonic voltage signal. The signal is mixed in a heterodyne circuit 34 with a carrier signal 31 from a processor 36, which carrier signal may have a frequency range of 20 kHz to 100 kHz, The heterodyne circuit 34 includes a low pass filter that extracts the audio spectrum signal 33 from the modulated signal's spectrum. The audio signal 33 is equivalent to the ultrasonic signal, but shifted in frequency to the audio range. The audio signal 33 is sent both to a separate analog-to-digital converter channel of the processor 36 and to an amplifier 39, where it is used elsewhere. Also, the ultrasound signal 35 is sent directly to the processor, which has the ability to digitally heterodyne the ultrasonic signal, if required.

Figure 3:
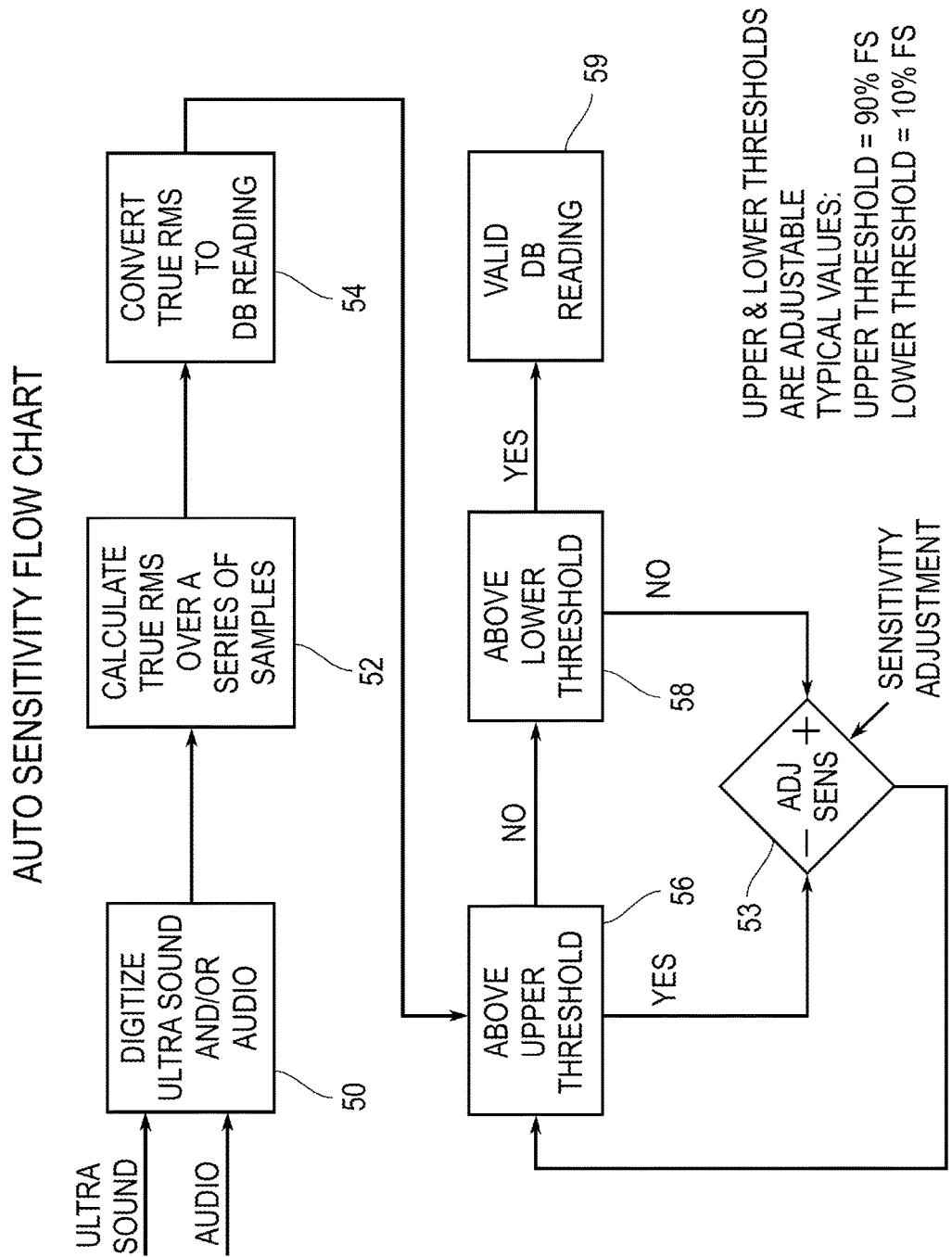
FIG. 3 is a flow chart of the auto sensitivity adjustment algorithm operation of the circuit of FIG. 2.

The processor 36 makes a determination about the amplitude of the audio signal based on the minimum signal the sensor can detect and generates a sensitivity adjustment signal 37 based on an "auto sensitivity adjustment algorithm." As shown in the flow chart of FIG. 3. The sensitivity adjustment signal 37 adjusts the gain of the analog front end amplifier 32 so the circuits after it are not saturated and/or have sufficient amplitude for an accurate measurement. The processor has storage, which stores data as well as the programs that control the processor to produce the sensitivity adjustment, the digital heterodyning and filtering and other information signals.

A voltage to current converter 38 receives a DC voltage (DAC Output-1) 42 from processor 36 and produces a sensor output that is a dB output linearly proportional to the amplitude of the heterodyne audio or ultrasound. In an exemplary embodiment the DAC Output-1 is converted to a linear current output with a range of approximately 0.50 mA to 16.30 mA. This range corresponds to a 0 dB to 100 dB change in amplitude of the ultrasound signal received directly from the analog front end 32 or the heterodyned audio. Wider ranges are available. The output signal can also be configured as a scaled output 0 to 25 mA current signal, or a 4 to 20 mA current loop.

The sensor has a feature that allows the processor to digitally heterodyne the ultrasound and digitally filter out the digital audio data. DAC Output-2 44 is the analog audio signal that is reconstructed from the digital audio data from the digital heterodyne process. This process is separate from the analog heterodyning process. There may be some nuances that one heterodyne process may pick up that the other may not. Therefore, both analog and digital heterodyning processes can be made available for maximum flexibility.

In addition to calculating sensitivity, the processor performs fast Fourier transfer (FFT) calculations and/or other digital signal processing algorithms. The processor has a communications output 46 that provides dB and data outputs by means of digital-to-analog converters, communication ports and protocols. The communication output may also provide temperature, and WAV file data for additional external analysis.

The auto sensitivity operation of processor 36 is shown in FIG. 3. At step 50, ultrasound and audio signals are digitized. Then at step 52 the true RMS values of the signals are calculated over a series of samples. Next at step 54 the true RMS values of the signals are converted to dB readings. A decision is made at step 56 as to whether the dB reading is above an upper threshold. If it is not, a determination is made at step 58 as to whether the dB signal is above the lower threshold. If the answer is yes, the reading is valid and is output at step 59 as a valid dB reading. This indicates that there is no need to change the sensitivity adjustment signal.

If at step 56 it is determined that the dB reading is above the upper threshold, the sensitivity signal is reduced by an increment at step 53 and the new value is tested again at step 56 to see if it is still above the upper threshold. Similarly, if in step 58 it is determined that the dB signal is not above the lower threshold, the sensitivity signal is increased by an increment in step 53 and the decisions about being above the upper threshold and below the lower threshold are repeated in steps 56 and 58 until there is no change, indicating that the gain has been adjusted to put the input signal in the operative range. The upper and lower thresholds are adjustable. Typically, the upper threshold is 90% of full scale and the lower threshold is 10% of full threshold. Also, the signal adjustment increments may be adjustable.

Thus, the auto sensitivity adjustment algorithm determines whether the signal is saturating, i.e., above the upper threshold, which can prevent the making of accurate decibel calculations. In such a case the auto sensitivity algorithm calculates a lower sensitivity setting (gain) to bring the ultrasonic signal to within an acceptable working range The processor also calculates a lower sensitivity threshold, which the signal must be above in order to bring the ultrasonic signal to within an acceptable working range. In such a case the auto sensitivity algorithm calculates a higher sensitivity setting to bring the ultrasonic signal up to within an acceptable working range.

The processor monitors the digitized amplitude level of both the ultrasound and the audio and automatically adjusts the sensitivity (the gain) of the analog front end preamplifier if the digitized amplitude level is out of range, i.e., "auto sensitivity adjustment is performed." When the ultrasound and/or the audio are in an acceptable working range the processor calculates the ultrasound amplitude dB value and the audio amplitude dB value.

The sensor has the ability to heterodyne the ultrasound that is fed into the processor's analog to digital converter directly using digital signal processing techniques. These techniques include generation of a configurable carrier signal, performing digital amplitude modulation with the configurable carrier frequency and the digitizing of the amplitude of the ultrasound, and extracting the digital heterodyned audio spectrum "digital audio" produced by the digital AM modulation using low pass digital filtering algorithms.

The sensor provides enhanced signal processing capabilities of the detected ultrasound or heterodyned ultrasound signal, such as spurious glitch detection and/or filtering, fast or slow peak detection, and other advanced pattern recognition capabilities that allows for the detection, processing, and/or reporting of specific events.

The sensor provides enhanced signal processing capabilities for the detected ultrasound or heterodyned ultrasound signal, such as spurious glitch detection and/or filtering, fast or slow peak detection, and other advanced pattern recognition capabilities that allows for the detection, processing, and/or reporting of specific events.

The auto-sensitivity adjustment feature enables users to automatically adjust the sensitivity in a range from 0 dB to 100 dB, and may be 0 dB to 120 dB, as opposed to the 40 dB adjustable window of the prior art.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of example and not by way of limitation. The description enables one skilled in the art to make and use the present invention, and describes several embodiments, adaptations, variations, and method of uses of the present invention.

What is claimed is:

1. An automatic sensitivity adjusting analog ultrasonic sensor comprising:
   an ultrasonic transducer that converts ultrasonic vibrations into ultrasonic electrical signals;
   a front end amplifier with an adjustable gain that receives the ultrasonic signal from the transducer and amplifies it by a variable gain;
   a processor that generates a carrier signal;
   a heterodyning circuit that combines the carrier signal and the amplified ultrasonic signal from the amplifier to form a modulated signal spectrum from which an audio spectrum signal is generated;
   wherein the processor monitors the amplitude level of the audio spectrum signal and executes an auto sensitivity adjustment algorithm that automatically adjusts the sensitivity (the gain) of the analog front end amplifier down if the amplitude is above a preset upper threshold or up if the amplitude is below a present lower threshold.

2. The automatic sensitivity adjusting analog ultrasonic sensor of claim 1 wherein the front end amplifier sends the ultrasonic signal to the processor and the processor digitally heterodynes and filters the ultrasonic signal into a digital audio spectrum signal, and wherein the processor separately monitors the amplitude level of the ultrasound signal, the audio spectrum signal and the digital audio spectrum signal of the processor and automatically adjusts the sensitivity (the gain) of the analog front end amplifier down if any of the amplitudes is above a preset upper threshold or up if any of the amplitudes is below a present lower threshold; and wherein both the analog audio spectrum signal and digital audio spectrum signal are made available.

3. The automatic sensitivity adjusting analog ultrasonic sensor of claim 1 wherein the carrier signal is in the range of 20 kHz to 100 kHz.

4. The automatic sensitivity adjusting analog ultrasonic sensor of claim 1 wherein the heterodyning circuit includes a low pass digital filter algorithm for extracting the audio spectrum from the modulated signal spectrum.

5. The automatic sensitivity adjusting analog ultrasonic sensor of claim 1 wherein the processor generates a DC voltage (DAC Output-1) related to the amplitude of the heterodyne audio or ultrasound signals and further including a voltage to current converter that receives the DAC Output 1 and produces a sensor output that is a dB output linearly proportional to the amplitude of the heterodyne audio or ultrasound signals.

6. The automatic sensitivity adjusting analog ultrasonic sensor of claim 5 wherein the DAC Output-1 is converted to a linear current output with a range of approximately 0.50 mA to 16.30 mA, which corresponds to a 0 dB to 100 dB change in amplitude of the ultrasound signal received directly from the analog front end and the heterodyned audio.

7. The automatic sensitivity adjusting analog ultrasonic sensor of claim 6 wherein the output of the voltage to current converter is a scaled output of 0 to 25 mA current or a 4 to 20 mA current loop.

8. The automatic sensitivity adjusting analog ultrasonic sensor of claim 5 wherein the sensitivity adjustment range is up to 120 dB.

9. The automatic sensitivity adjusting analog ultrasonic sensor of claim 1 wherein the processor performs fast Fourier transfer (FFT) calculations and/or other digital signal processing algorithms that are made available at its output, and the processor further has a communications output that provides dB and data outputs by means of digital-to-analog converters, communication ports and protocols.

10. The automatic sensitivity adjusting analog ultrasonic sensor of claim 9 wherein the communication output provides temperature, and WAV file data for additional external analysis.

11. The automatic sensitivity adjusting analog ultrasonic sensor of claim 1 wherein the auto sensitivity adjustment algorithm comprises the steps of:

digitizing the ultrasound and audio signals;
calculating the true RMS values of the digitized ultrasound and audio signals over a series of samples;
converting the true RMS values of the signals to dB readings;

a first deciding step to determine whether the dB reading is above an upper threshold, and if it is not, performing a second deciding step to determine whether the dB reading is above the lower threshold and, if it is, determining that the reading is valid and making no change to a sensitivity adjustment signal;
if at the first deciding step it is determined that the dB reading is above an upper threshold, reducing the sensitivity adjustment signal;
if at the second deciding step it is determined that the dB reading is below a lower threshold, increasing the sensitivity adjustment signal; and
after a change in the adjustment signal, subjecting dB reading to the first and second deciding steps again until there is no change.

12. The automatic sensitivity adjusting analog ultrasonic sensor of claim 11 wherein the upper and lower thresholds are adjustable and the reducing and increasing of the sensitivity adjustment signal is in increments that are adjustable.

13. The automatic sensitivity adjusting analog ultrasonic sensor of claim 12 wherein the upper threshold is 90% of full scale and the lower threshold is 10% of full scale.

14. The sensitivity adjusting analog ultrasonic sensor of claim 1 wherein the processor analyzes the ultrasound or heterodyned ultrasound signal to perform spurious glitch detection and/or filtering, fast or slow peak detection, and other advanced pattern recognition capabilities that allow for the detection, processing, and/or reporting of specific events.

15. An automatic sensitivity adjusting analog ultrasonic sensor comprising:

an ultrasonic transducer that converts ultrasonic vibrations into ultrasonic electrical signals;
a front end amplifier with an adjustable gain that receives the ultrasonic signal from the transducer and amplifies it by a variable gain;
a processor that receives the amplified ultrasonic signal from amplifier and monitors its amplitude, based on the monitored amplitude the processor executes an auto sensitivity adjustment algorithm to automatically create a signal that adjusts the gain of the front end amplifier down if the amplitude is above a preset upper threshold or up if the amplitude is below a present lower threshold.

16. The automatic sensitivity adjusting analog ultrasonic sensor of claim 15 wherein the auto sensitivity adjustment algorithm comprises the steps of:

digitizing the ultrasound and audio signals;
calculating the true RMS values of the digitized ultrasound and audio signals over a series of samples;
converting the true RMS values of the signals to dB readings;
a first deciding step to determine whether the dB reading is above an upper threshold, and if it is not, performing a second deciding step to determine whether the dB reading is above the lower threshold and, if it is, determining that the reading is valid and making no change to a sensitivity adjustment signal;
if at the first deciding step it is determined that the dB reading is above an upper threshold, reducing the sensitivity adjustment signal;
if at the second deciding step it is determined that the dB reading is below a lower threshold, increasing the sensitivity adjustment signal; and
after a change in the adjustment signal, subjecting dB reading to the first and second deciding steps again until there is no change.

17. A automatic sensitivity adjusting analog ultrasonic sensor comprising:
- an ultrasonic transducer that converts ultrasonic vibrations into ultrasonic electrical signals;
- a front end amplifier with an adjustable gain that receives the ultrasonic signal from the transducer and amplifies it by a variable gain; and
- a processor that receives the amplified ultrasonic signal from amplifier and digitally heterodynes and filters the amplified ultrasonic signal to produce a digital audio spectrum signal, and wherein the processor monitors the amplitude level of the digital audio spectrum signal and executes an auto sensitivity adjustment algorithm to automatically adjusts the sensitivity (the gain) of the analog front end amplifier down if the amplitude is above a preset upper threshold or up if the amplitude is below a present lower threshold.

18. The automatic sensitivity adjusting analog ultrasonic sensor of claim 17 wherein the processor generates an output DC voltage (DAC Output-2) related to the digital heterodyne signal.

19. The sensitivity adjusting analog ultrasonic sensor of claim 17 wherein the auto sensitivity adjustment algorithm comprises the steps of:
- digitizing the ultrasound and audio signals;
- calculating the true RMS values of the digitized ultrasound and audio signals over a series of samples;
- converting the true RMS values of the signals to dB readings;
- a first deciding step to determine whether the dB reading is above an upper threshold, and if it is not, performing a second deciding step to determine whether the dB reading is above the lower threshold and, if it is, determining that the reading is valid and making no change to a sensitivity adjustment signal;
- if at the first deciding step it is determined that the dB reading is above an upper threshold, reducing the sensitivity adjustment signal;
- if at the second deciding step it is determined that the dB reading is below a lower threshold, increasing the sensitivity adjustment signal; and
- after a change in the adjustment signal, subjecting dB reading to the first and second deciding steps again until there is no change.

* * * * *